US006904006B2

(12) United States Patent
Mabuchi

(10) Patent No.: US 6,904,006 B2
(45) Date of Patent: Jun. 7, 2005

(54) OPTICAL DISK REPRODUCING APPARATUS HAVING A ROTARY TABLE INCLUDING A PLURALITY OF PROTRUDING ELEMENTS

(75) Inventor: Takehiro Mabuchi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 163 days.

(21) Appl. No.: 10/341,676

(22) Filed: Jan. 14, 2003

(65) Prior Publication Data

US 2003/0133371 A1 Jul. 17, 2003

(30) Foreign Application Priority Data

Jan. 15, 2002 (JP) ....................................... 2002-006315

(51) Int. Cl.⁷ .......................... G11B 21/08; G11B 7/085
(52) U.S. Cl. .................................................. 369/30.93
(58) Field of Search .......................... 369/30.93, 30.95, 369/30.9, 30.64, 30.6, 178.01; 360/98.04, 98.06, 98.08; 720/604, 612, 615; D14/363, 366, 369

(56) References Cited

U.S. PATENT DOCUMENTS 6,714,507 B2 * 3/2004 Kato ........................ 369/271.1

FOREIGN PATENT DOCUMENTS

JP          2000-276819        10/2000

* cited by examiner

Primary Examiner—Julie Anne Watko
(74) Attorney, Agent, or Firm—Pillsbury Winthrop Shaw Pittman LLP

(57) ABSTRACT

Rotary table of an optical disk reproducing apparatus is mounted on a tray for rotation in a clockwise or counter-clockwise direction, and it has a plurality of disk-holding depressed portions. These depressed portions are provided in such a manner that their respective centers are located at equal intervals on and along a predetermined imaginary circle line defined about a rotation center of the rotary table. Protruding elements are provided between every adjacent pair of the depressed portions, and each of the protruding elements has an upper surface that is located above the lower surface of an optical disk left adhering to a disk damper but below the lower surface of the disk damper in a non-clamping position.

5 Claims, 10 Drawing Sheets

OPTICAL DISK REPRODUCING APPARATUS HAVING A ROTARY TABLE INCLUDING A PLURALITY OF PROTRUDING ELEMENTS

BACKGROUND OF THE INVENTION

The present invention relates to optical disk reproducing apparatus for reproducing any one of a plurality of optical disks held on a rotary table.

Carousel-type optical disk reproducing apparatus have been known where a rotary table (known as a carousel disk changer) for holding a plurality of optical disks thereon is rotatably mounted on a tray movable (loadable and ejectable) into and from a body of the apparatus, so that the optical disk to be reproduced can be changed by rotating the rotary table.

In reproduction by such a carousel-type optical disk reproducing apparatus, a desired one of the optical disks held in respective depressed portions of the rotary table is clamped by a disk catcher mechanism that includes a disk damper and turntable. Specifically, the desired optical disk is clamped by the turntable first fitting into the central hole of the optical disk from below the disk and then ascending, together with the optical disk, up to a position where the upper surface of the optical disk is pressed by the turntable against the disk damper so that the disk can be rotated for reproduction by the reproducing apparatus.

However, even after the optical disk, having been reproduced in the above-mentioned manner, is released from the clamping force by the disk catcher mechanism, the reproduced optical disk would sometimes be left adhering to the disk damper due to a sticky substance pushed out from a label-attached surface (i.e., upper surface) of the disk or a sticky substance present on the lower surface of the disk clamper. If reproduction of another one of the optical disks on the rotary table is instructed with the reproduced optical disk undesirably left adhering to the disk clamper, then the rotary table is rotated without the reproduced optical disk being brought back to and received in the corresponding depressed portion of the rotary table, which would therefore become a cause of a significant breakdown or failure of the optical disk reproducing apparatus.

SUMMARY OF THE INVENTION

In view of the foregoing, it is an object of the present invention to provide an improved optical disk reproducing apparatus which allows an optical disk, undesirably left adhering to a disk damper of a disk catcher mechanism, to be reliably brought back to and received in a depressed portion of a rotary table.

In order to accomplish the above-mentioned object, the present invention provides an improved optical disk reproducing apparatus which comprises: a tray movable (loadable and ejectable) into and out of a body of the optical disk reproducing apparatus; a rotary table rotatably mounted on the tray and having a plurality of depressed portions for holding therein a plurality of optical disks; and a disk damper that, when the rotary table is brought to a predetermined positional relationship to the tray, clamps a particular optical disk, held in one of the depressed portions, at a predetermined clamping position above the upper surface of the rotary table for reproduction of the particular optical disk. In the present invention, the rotary table has a plurality of protruding elements, such as protrusions, provided in corresponding relation to the disk-holding depressed portions near the outer peripheral edges of the corresponding depressed portions, and each of the protruding elements is provided at such a position that, as the rotary table is rotated upon removable of a clamping force by the disk clamper, the protruding element can press an optical disk undesirably left adhering to the disk damper to thereby remove the adhering optical disk from the disk clamper.

With such arrangements, the present invention allows the optical disk, undesirably left adhering to the disk clamper after removal of the disk clamping force, to be readily removed or peeled from the disk clamper and reliably brought back to and received in the corresponding depressed portion of the rotary table.

The following will describe embodiments of the present invention, but it should be appreciated that the present invention is not limited to the described embodiments and various modifications of the invention are possible without departing from the basic principles of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE INVENTION

Figure 1:
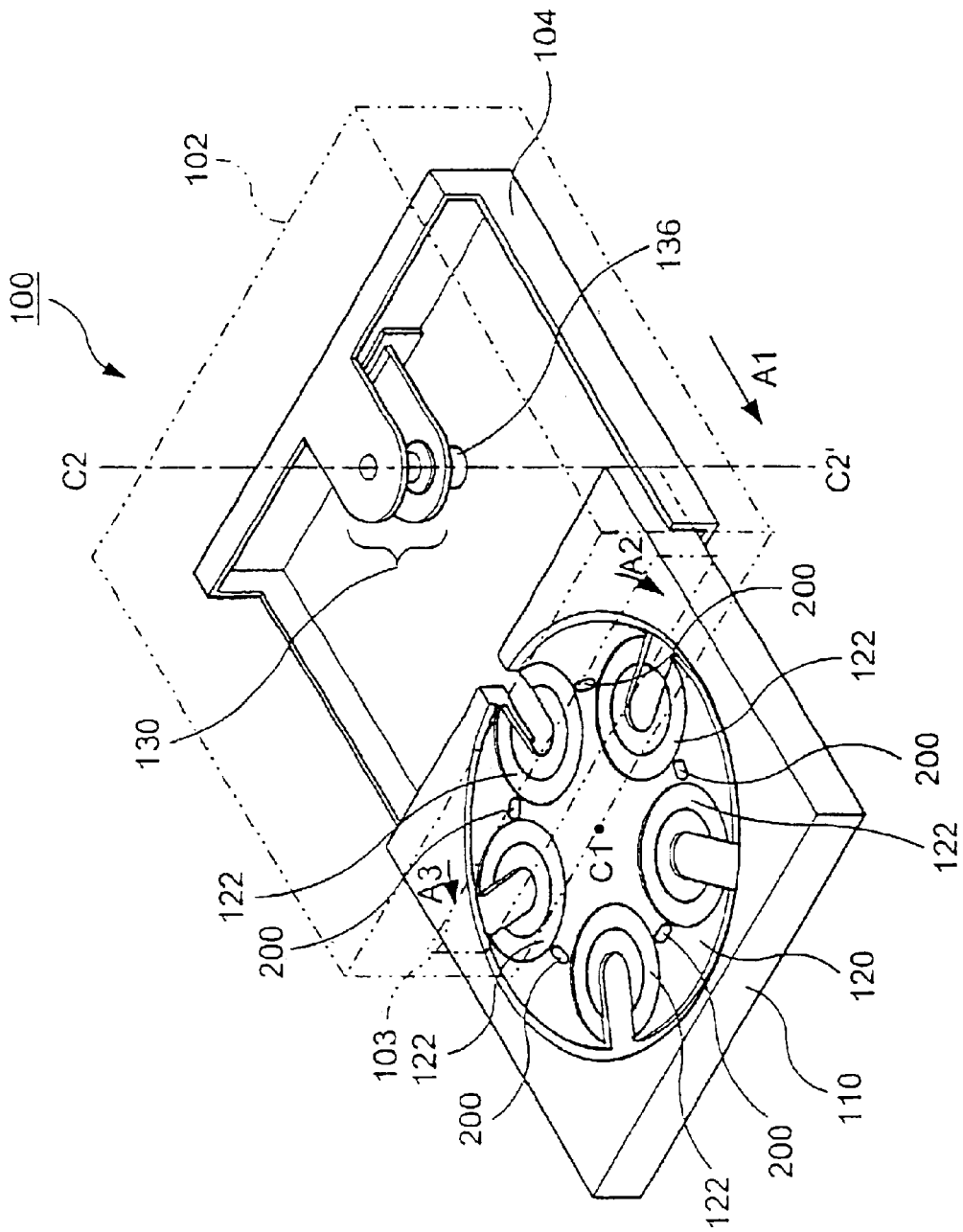
FIG. 1 is a perspective view showing a general interior structure of an optical disk reproducing apparatus in accordance with an embodiment of the present invention.
Figure 2:
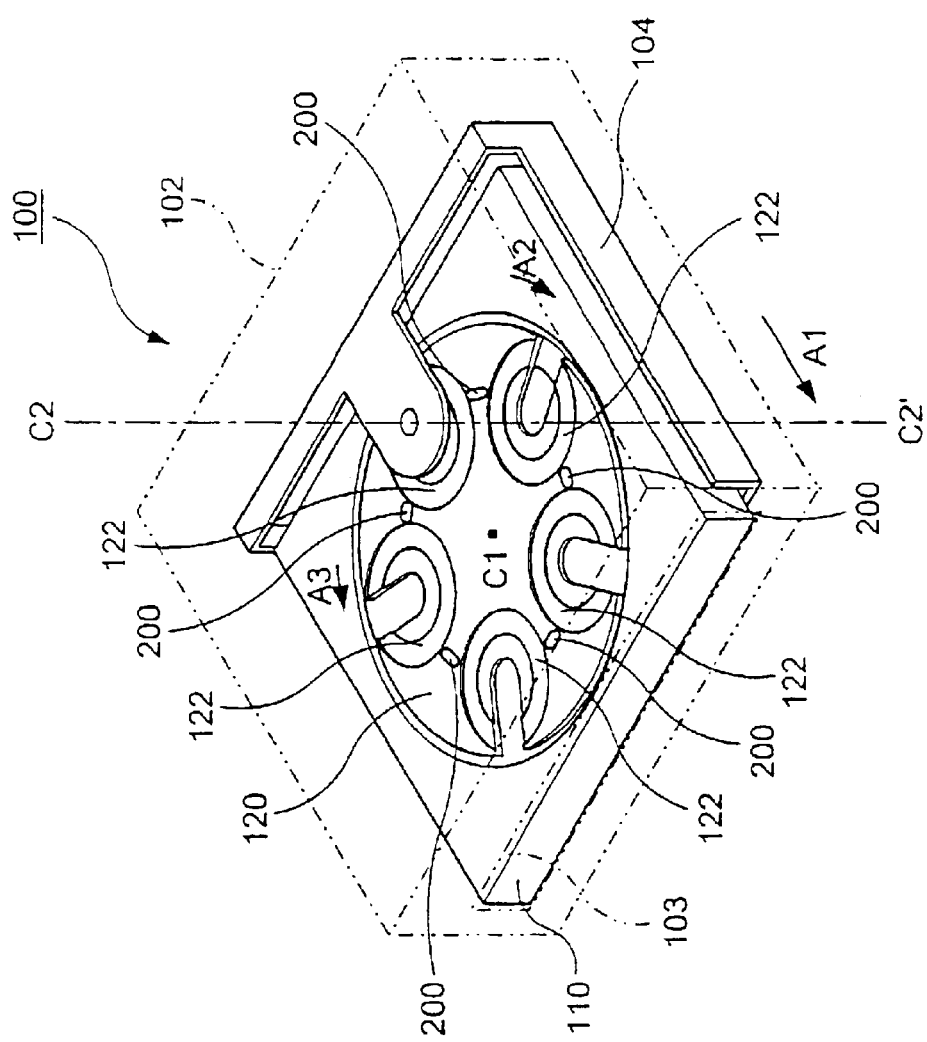
FIG. 2 is a perspective view of the interior structure of the optical disk reproducing apparatus, which particularly shows a rotary table, tray and disk damper of the optical disk reproducing apparatus of FIG. 1.

First, a description will be made about a general structure of an optical disk reproducing apparatus of the present invention. FIGS. 1 and 2 are perspective view showing an interior structure of an optical disk reproducing apparatus 100 in accordance with an embodiment of the present invention. As shown in these figures, a main body 102 of the optical disk reproducing apparatus 100 includes a mechanical chassis 104 for holding a tray 110 that is used to transfer an optical disk into or out of the main body 102. The tray 110 is held by the mechanical chassis 104 in such a manner that it can be ejected in a direction of arrow Al and again loaded into the mechanical chassis 104 through an access opening 103. FIG. 1 shows the optical disk reproducing apparatus 100 when the tray 110 is in the ejected position, while FIG. 2 shows the optical disk reproducing apparatus 100 when the tray 110 is in the loaded position.

Further, a rotary table 120 of a generally circular shape is mounted on the tray 110 for rotation about a center C1 in a clockwise direction A2 or counterclockwise direction A3. The rotary table 120 has five depressed portions 122, formed in the upper surface thereof, for holding therein the same number of optical disks; that is, five optical disks are supported on the respective upper surfaces of the depressed portions 122. Note that whereas five depressed portions 122 are provided in the illustrated example, the number of the depressed portions 122 is not limited to five and may be greater or smaller than five.

As shown in FIG. 1, a disk catcher mechanism 130, including a motor 136 etc., is provided in a rear end portion of the mechanical chassis 104. The disk catcher mechanism 130 clamps an optical disk to be reproduced in such a manner that the optical disk to be reproduced can be rotated about a rotation center C2. Although the optical disk reproducing apparatus 100 includes various other mechanisms than the disk catcher mechanism 130, such as a mechanism for ejecting and loading the tray 110 and a mechanism for rotating the rotary table 120, these other mechanisms will not be described since they are not directly pertinent to the subject matter of the present invention.

Figure 3:
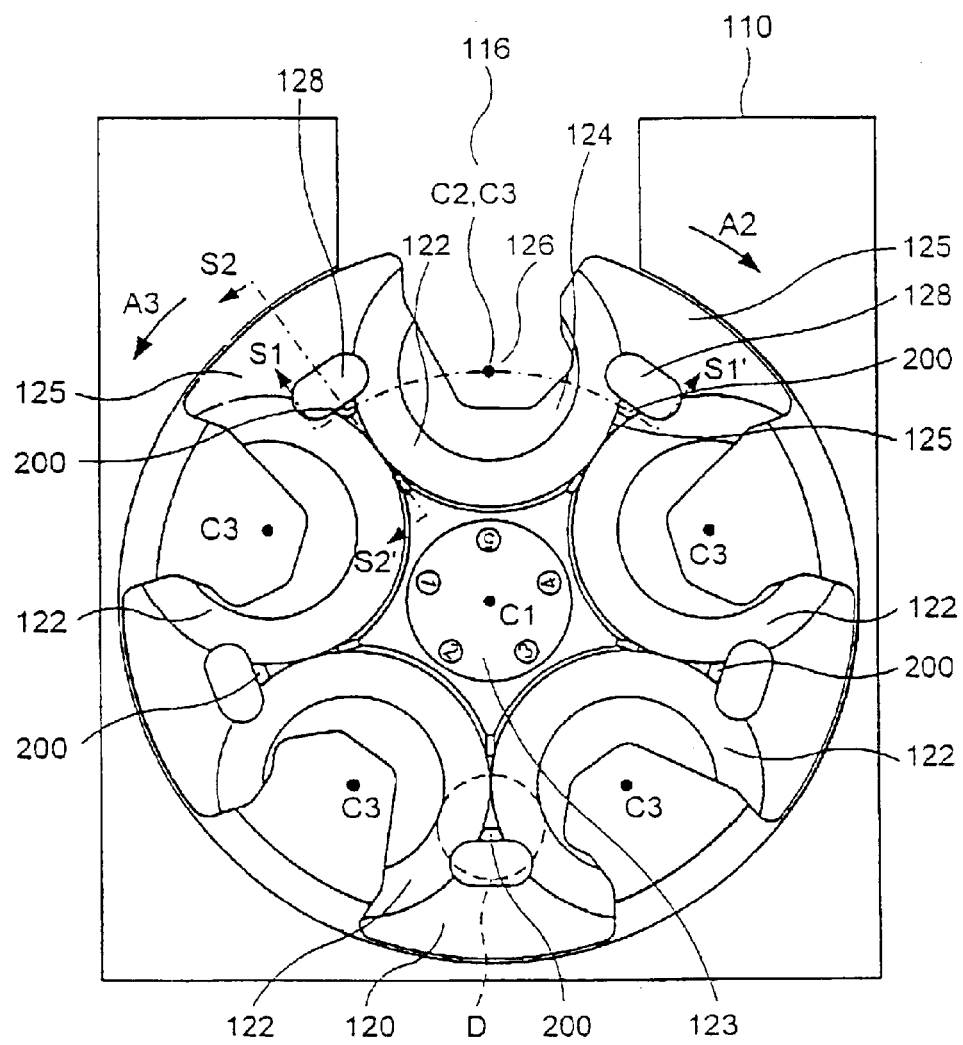
FIG. 3 is a top plan view of the tray employed in the optical disk reproducing apparatus.

Next, a description will be given about the tray 110 and rotary table 120. FIG. 3 is a top plan view of the tray 110, FIG. 4 is a sectional view taken along the S1–S1' lines of FIG. 3 and showing the rotary table 120 and peripheral components associated therewith, and FIG. 5 is a sectional view taken along the S2–S2' lines of FIG. 3 and showing the rotary table 120.

Figure 4:
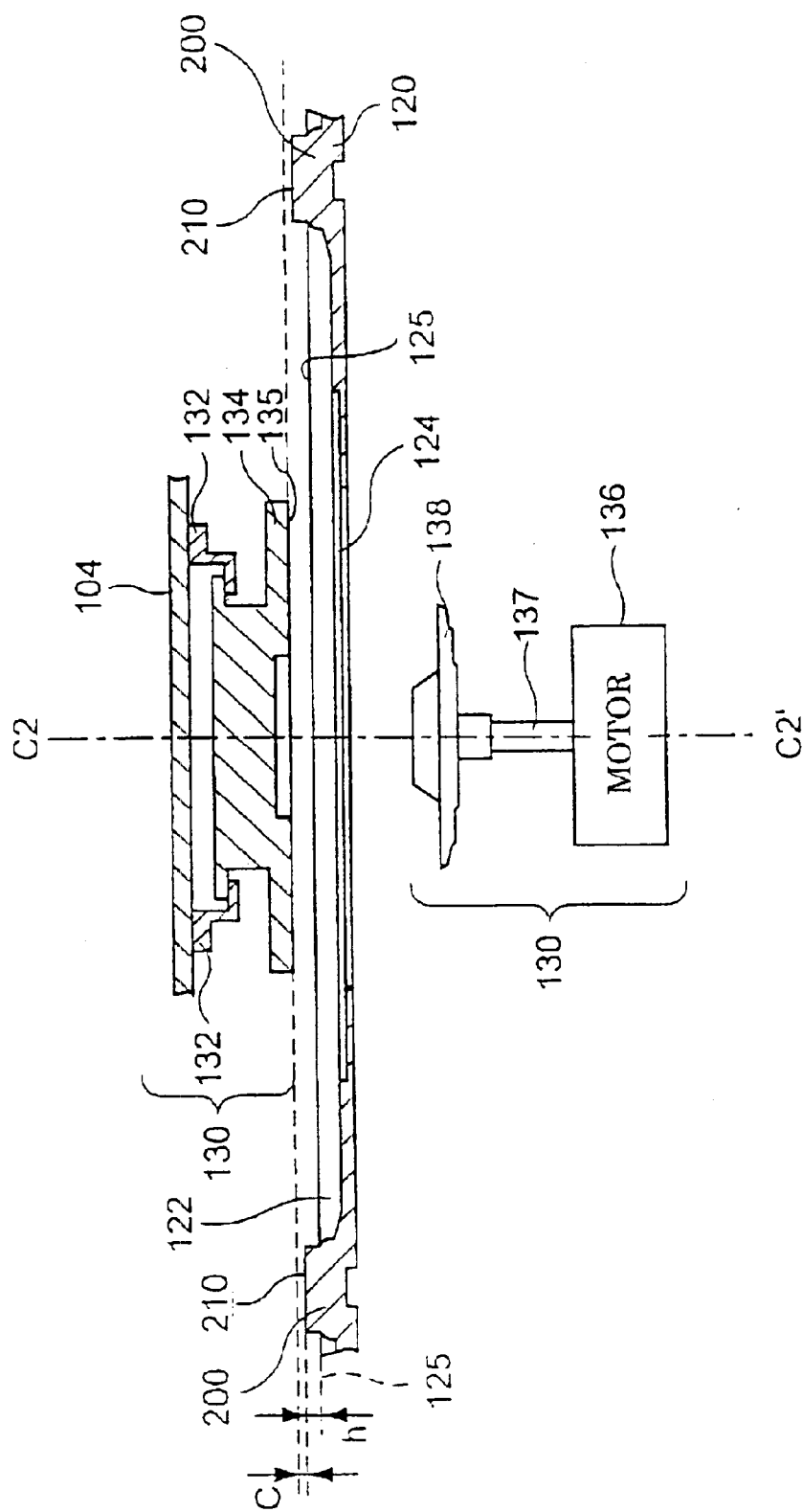
FIG. 4 is a sectional view taken along the S1–S1' lines of FIG. 3, which shows the rotary table and peripheral components associated therewith.
Figure 5:
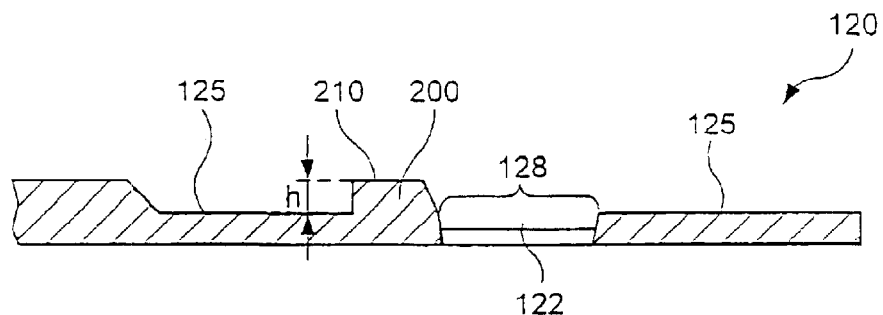
FIG. 5 is a sectional view taken along the S2–S2' lines of FIG. 3, which shows the rotary table.

As clearly shown in FIGS. 3 and 4, the rotary table 120 has the file depressed portions 122 formed therein for holding therein optical disks each having a 0.12 m diameter. Specifically, these depressed portions 122 are formed on and along an imaginary circle line about a center C1 of the rotary table 120 in such a manner that respective centers C3 of the depressed portions 122 are located at equal intervals along the imaginary circle line. Each of the depressed portions 122 has also a smaller-diameter depressed region 124 about the center C3 for holding therein a smaller optical disk having a 0.08 m diameter. When the tray 110 is being moved to the loaded position, when the rotary table 120 is being rotated, etc., each of the optical disks held in these depressed portions or regions 122 or 124 can be moved on the rotary table 120 while being supported by the inner wall surface of the depressed portion or region 122 or 124 without an undesired positional deviation relative to the depressed portion or region 122 or 124.

In FIG. 3, an identification area 123 is provided around the center C1 of the rotary table 120, where identifiers are displayed to allow a user to identify the individual depressed portions 122; in the illustrated example, numbers "1" to "5" are displayed in the identification area 123 in corresponding relation to the depressed portions 122. Aperture 128 is formed in the rotary table 120 between every adjacent pair of the depressed portions 122 so that, when inserting or taking a 0.12 m optical disk 300 into or from the depressed portion 122, a finger of the user supporting the optical disk 300 can pass through the aperture 128. Note that the apertures 128 are not shown in FIGS. 1 and 2 for purposes of clarity.

Further, each of the depressed portions 122 has a recess 126 opening outwardly of the rotary table 120. The tray 110 has an opening 116 formed near a widthwise middle region of a rear end portion (upper end portion in the figure) thereof. To change the optical disk to be reproduced by the optical disk reproducing apparatus 100, the rotary table 120 is turned to stop at such a position or angle where the opening 116 of the tray 110 aligns with the recess 126 formed in the depressed portion 122 in which the optical disk to be next reproduced is held. Specifically, the rotary table 120 is caused to stop at the position where the reproducing rotation center C2 aligns, in a radial direction of the rotary table 120, with the center C3 of the depressed portion 122 holding therein the optical disk to be next reproduced. In this way, the disk catcher mechanism 130 can freely pass through the opening 116 of the tray 110 into the recess 126 and thereby clamp the optical disk 300 held in the depressed portion 122.

This and following paragraphs discuss details of the disk catcher mechanism 130, with reference to FIG. 4. As shown, a damper holder 132 is secured to an underside portion of the mechanical chassis 104 located above the rotary table 120. The clamper holder 132 holds a disk damper 134 for rotation about the reproducing rotation center C2. Further, a motor 136 is disposed below the rotary table 120 in such a manner that the motor 136 can move in an up-and-down direction. Reproducing turntable 138 is fixed to a rotation shaft 137 of the motor 136. To reproduce an optical disk in the optical disk reproducing apparatus 100 thus arranged, the motor 136 is caused to go up until the reproducing turntable 138, fittingly holding the optical disk 300, is lifted to a position where the upper surface of the optical disk 300 abuts against the lower surface 135 of the disk clamper 134. Thus, the optical disk 300 can be held or clamped between the reproducing turntable 138 and the disk damper 134 at a predetermined clamping position above the upper surface of the depressed portion 122 corresponding to the optical disk 300, where the optical disk 300 is rotated by the motor 136 via the rotation shaft 137 and turntable 138. Because the optical disk 300 is rotated above the upper surface 125 of the rotary table 120, the tray 110 can be moved between the ejected position and the loaded position during the reproduction of the optical disk 300. In this way, the user can insert or take a desired optical disk into or from one of the depressed portions 122 other than the depressed portion 122 corresponding to the currently-reproduced optical disk 300.

Where some sticky substance is present on the upper surface of the optical disk 300 or the like, there is a possibility of the optical disk 300 adhering to the disk clamper 134 due to the clamping by the disk catcher mechanism 130. In such a case, even when the reproducing turntable 138 has been moved downward away from the disk damper 134 (through as "clamp-down" operation), the optical disk 300 will be undesirably left adhering to the disk clamper 134 without falling into the corresponding depressed portion 122 of the rotary table 120.

To avoid the inconvenience, a protruding element 200, in the form of an upward protrusion, is provided on the rotary table 120 between every adjacent pair of the depressed portions 122, as illustratively shown in FIG. 3. The protruding element 200 functions to abut against and press the outer circumferential surface of the optical disk 300, left adhering to the disk damper 134, away from the disk clamper 134, to thereby compulsorily peel or remove the optical disk 300 from the disk damper 134, as the rotary table 120 is rotated after completion of the clam-down operation (i.e., after the optical disk 300 is released from a clamping force).

As shown in the figure, a plurality of the protruding elements or protrusions 200 are located along a trajectory (imaginary circle line) that is defined by the respective centers C3 of the depressed portions 122 during the rotation of the rotary table 120. Further, as shown in FIGS. 4 and 5, each of the protruding elements 200 is formed to project above the upper surface 125 of the rotary table 120; in the illustrated example, each of the protruding elements 200 is formed to have a 1.6 mm height as measured from the upper surface 125 of the rotary table 120. As also shown in FIG. 4, each of the protruding elements 200 has an upper surface 210 that is located slightly below the lower surface 135 of the disk clamper 136 when the disk clamper 136 is in a lowered or non-clamping (clamp-down) position; in the illustrated example, there is formed a clearance of 0.4 mm between the upper surface 210 of the protruding element 200 and the lower surface 135 of the disk clamper 136 in the lowered or non-clamping position. Each optical disk to be reproduced by the apparatus has a thickness of 1.2 mm, and thus the upper surface 210 of the protruding element 200 will be located about 0.8 mm above a horizontal plane including the lower surface of the optical disk 300 left adhering to the disk damper 134 when the damper 134 is in the non-clamping position.

Figure 6:
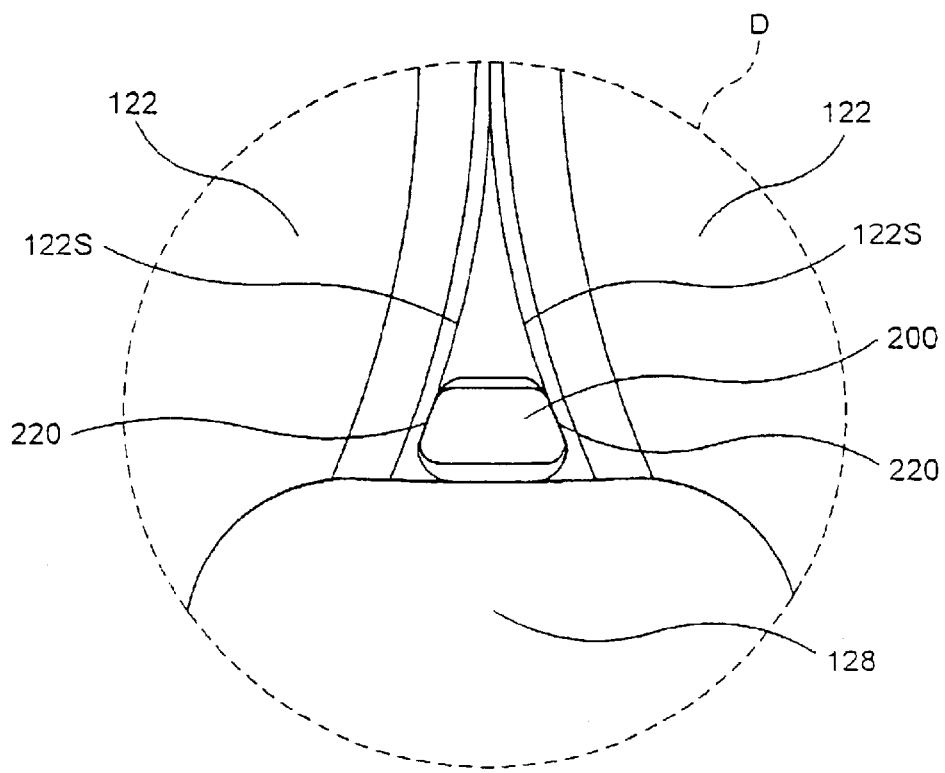
FIG. 6 is an enlarged view of the rotary table.

Further, FIG. 6 is an enlarged view of a section circled by dotted lines D in FIG. 3. As shown here, each of the protruding elements or protrusions 200 has arcuately-curved concave side surfaces 220. To be more specific, the side surfaces 220 of the protruding element 200, as viewed in cross section, are formed into symmetric arcuate concave surfaces corresponding to inner wall surfaces 122S of the adjacent depressed portions 122; namely, each of the side surfaces 220 of the protruding element 200 has a radius of curvature of 0.06 m that is identical to that of the inner wall surface 122S of the depressed portion 122. In other words, each of the side surfaces 220 of the protruding element 200 is shaped to substantially match to the shape of the outer circumference of the optical disk 300.

The optical disk reproducing apparatus 100 behaves as follows when an optical disk 300 left adhering to the disk damper 134 is removed from the disk damper 134 by rotation of the rotary table 120. First, after completion of the reproduction of the optical disk 300, the optical disk reproducing apparatus 100 performs the clamp-down operation with a view to bringing the reproduced optical disk 300 back into the corresponding depressed portion 122. If the optical disk 300 is left adhering to the disk damper 134 despite removal of the clamping force through the clamp-down operation, the apparatus 100 compulsorily removes the optical disk 300 from the disk damper 134 by rotating the rotary table 120 to cause any one (nearest one) of the protruding elements 200 to abut against and press the optical disk 300 adhering to the disk damper 134. Note that various control related to the removal of the optical disk 300 from the disk damper 134 is not described here because it is conventional and not directly pertinent to the essential features of the present invention.

Figure 7:
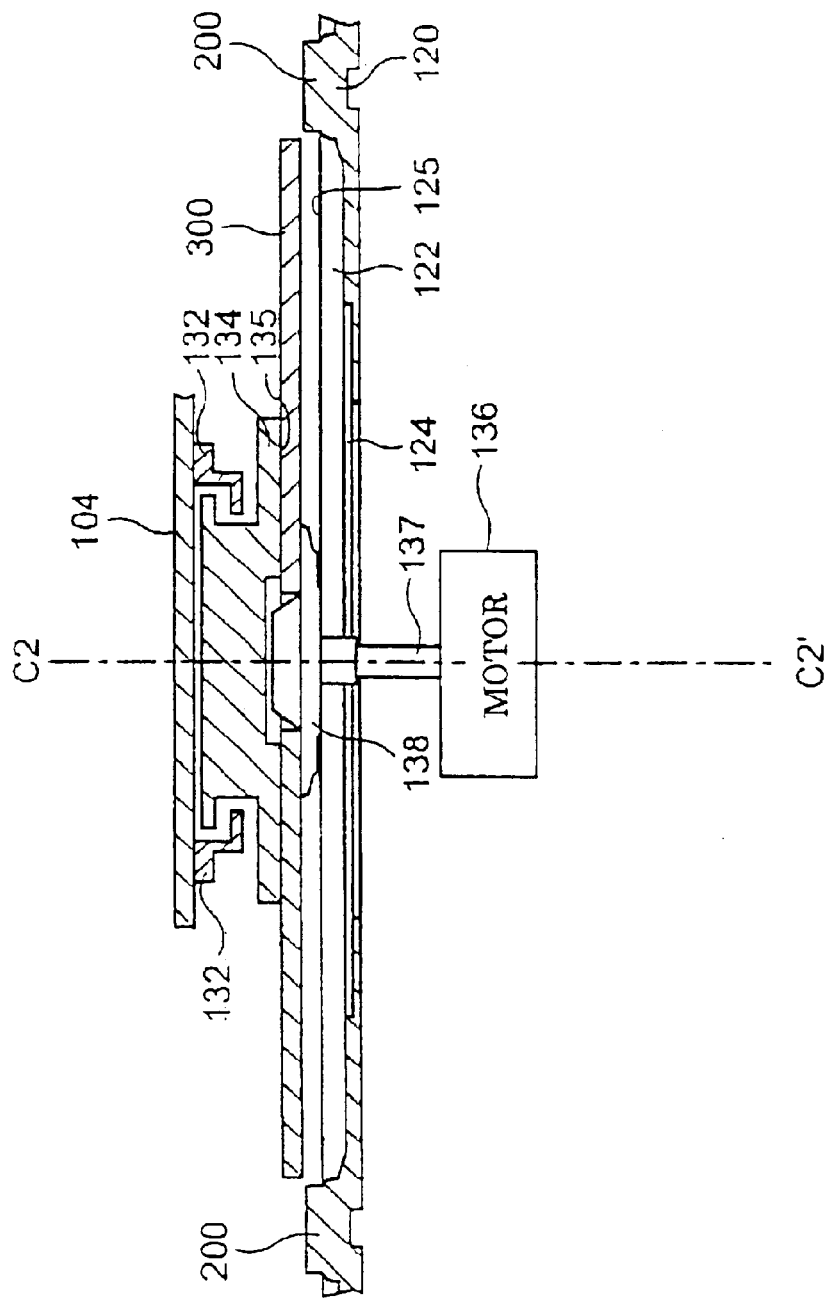
FIG. 7 is a sectional view explanatory of a manner in which an optical disk is reproduced by the optical disk reproducing apparatus.

FIG. 7 is a view explanatory of a manner in which an optical disk 300 is reproduced by the optical disk reproducing apparatus 100. As shown, the optical disk 300 is reproduced by being rotated at a predetermined rotating position where the disk 300 is lifted via the reproducing turntable 138 above the upper surface of the corresponding depressed portion 122 and clamped between the disk damper 134 and the reproducing turntable 138. Upon completion of the reproduction of the optical disk 300, the disk reproducing apparatus 100 performs the clamp-down operation with a view to bring the reproduced optical disk 300 back into the corresponding depressed portion 122.

Figure 8:
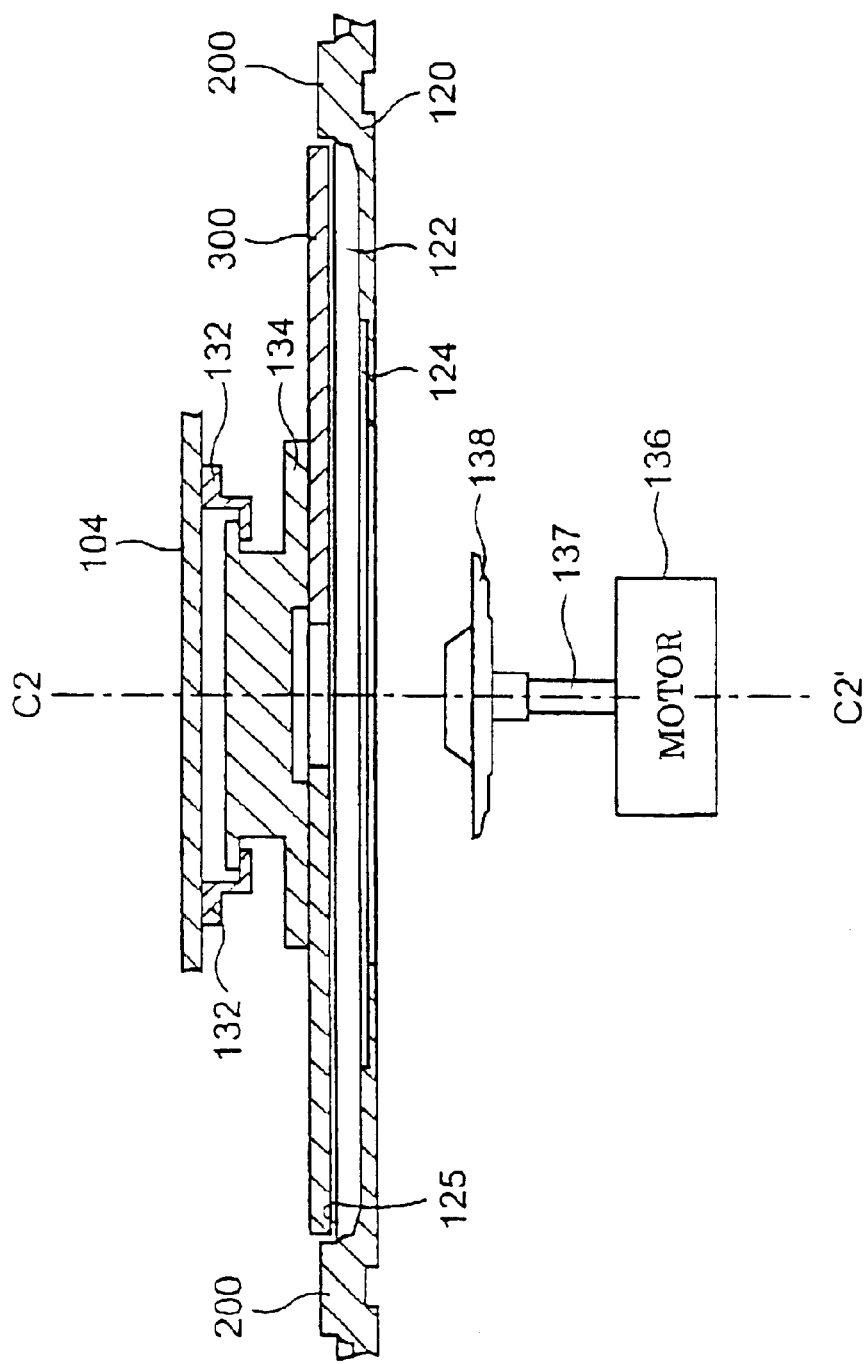
FIG. 8 is a view explanatory of a manner in which a reproduced optical disk is removed from the disk damper after the disk is released from a clamping force.

FIG. 8 is a view explanatory of a manner in which a reproduced optical disk is removed from the disk damper 134 after completion of the clamp-down operation by the apparatus 100. In this figure, the optical disk 300 is shown as still adhering to the disk damper 134 even though the clamp-down operation has been performed to release the optical disk 300 from the clamping force. In the instant embodiment, the apparatus 100 is arranged to remove the optical disk 300 from the disk damper 134 and returns the optical disk 300 into the corresponding depressed portion 122, utilizing rotation of the rotary table 120. After that, the disk reproducing apparatus 100 performs a disk change operation to permit reproduction of an optical disk received in another one of the depressed portions 122 of the rotary table 120.

Figure 9:
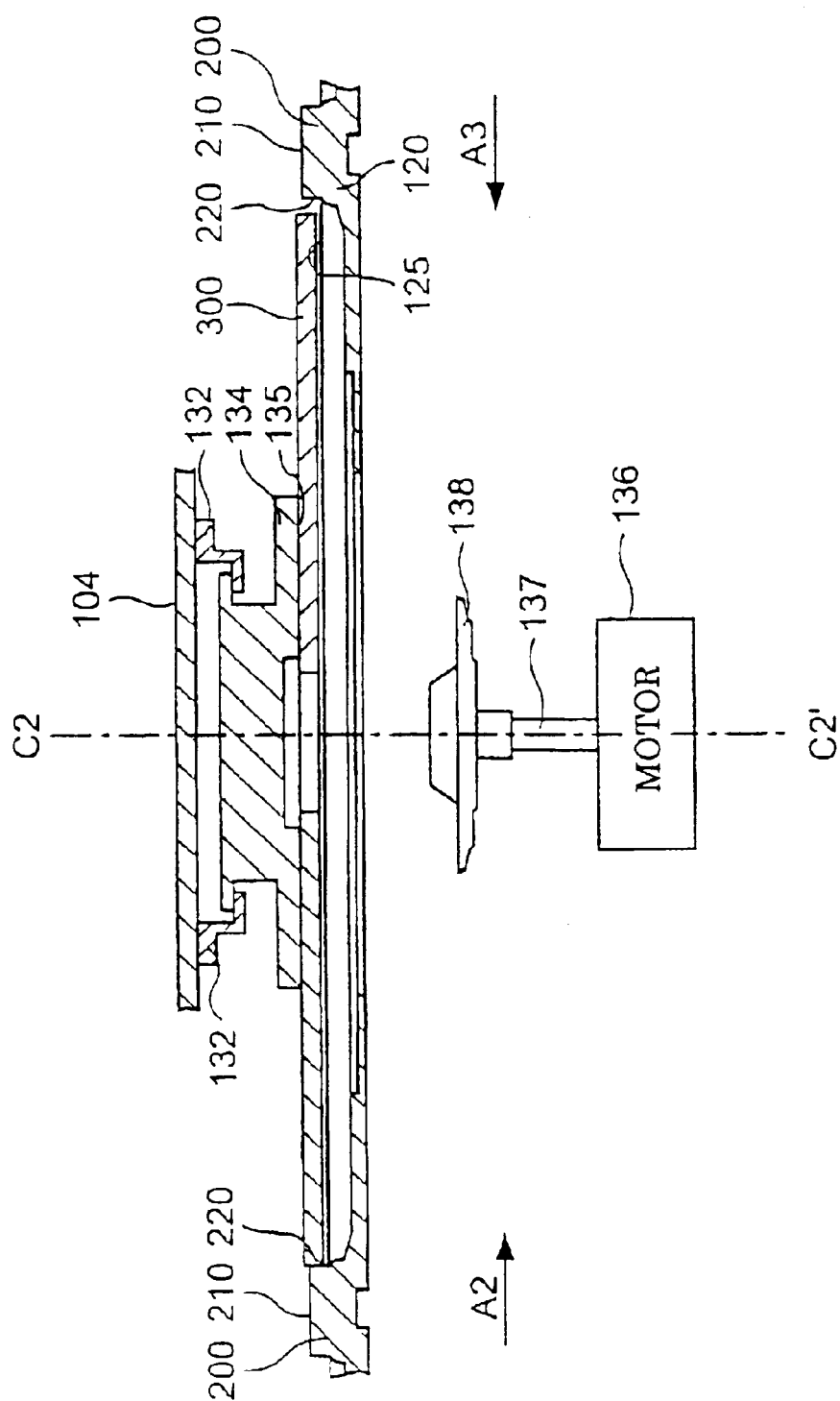
FIG. 9 is a view showing the rotary table rotating with a reproduced optical disk left adhering to the disk clamper.
Figure 10:
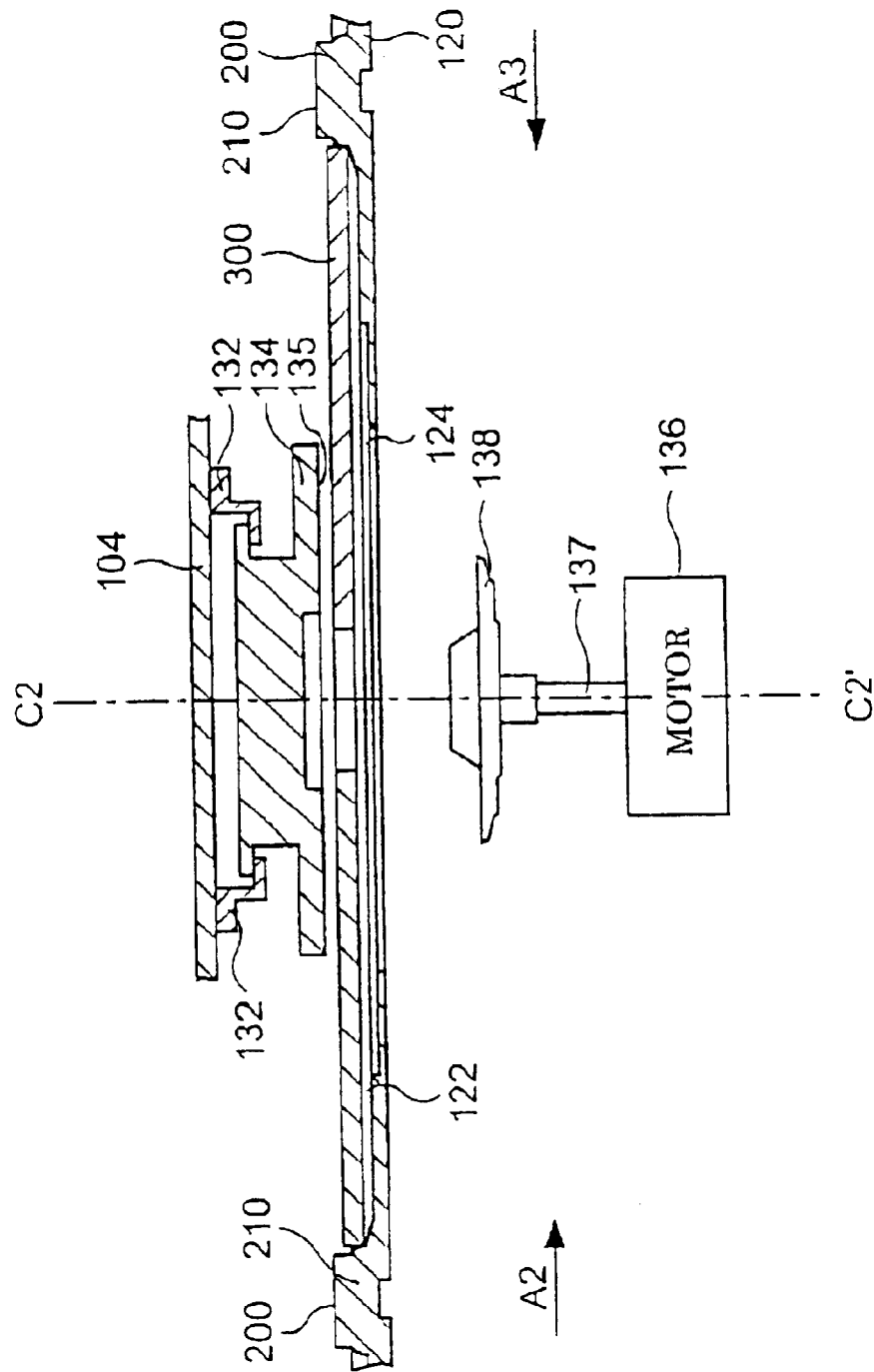
FIG. 10 is a view showing an optical disk having been brought back into a depressed portion of the rotary table.

FIG. 9 is a view showing the rotary table 120 rotating with an optical disk 300 undesirably left adhering to the disk damper 134 after the clamp-down operation. As the rotary table 120 is rotated in the clockwise direction denoted by arrow A2, the side surface 220 of the protruding element 200 immediately adjacent to the adhering optical disk 300 abuts against and then imparts the outer circumferential surface of the disk 300 with a pressing force in the clockwise direction A2. Such a clockwise pressing force compulsorily peels or removes the optical disk 300 from the disk damper 134, to thereby allow the disk 300 to fall into the depressed portion 122 for reception in the depressed portion 122 as illustrated in FIG. 10. Then, by further rotating the rotary table 120 in the same direction over a predetermined angle, the disk change operation can be performed appropriately to permit reproduction of another desired optical disk held on the rotary table 120. Because the upper surface 210 of the protruding element 200 is located below the lower surface 135 of the disk damper 134, there is no possibility of the disk damper 134 and the protruding element 200 contacting each other during the rotation of the rotary table 120. Further, because the protruding elements 200 are provided on opposite sides of each of the depressed portions 122, the optical disk 300 left adhering to the disk clamper 134 can be removed by rotating the rotary table 120 not only in the clockwise direction A2 but also in the counterclockwise direction denoted by arrow A3 in FIG. 9.

Further, in the instant embodiment, each of the side surfaces 220 of the protruding element 200 is shaped to substantially correspond to the shape of the outer circumference of the optical disk 300, as noted earlier. Thus, when the protruding element 200 presses the optical disk 300 adhering to the disk damper 134, one of the side surfaces of the protruding element 200 can appropriately engage with the outer circumferential surface of the adhering optical disk 300. In addition, the protruding elements 200 are located on end along the trajectory (imaginary circle line) that is defined by the respective centers C3 of the depressed portions 122 during the rotation of the rotary table 120. Therefore, when the protruding element 200 presses the optical disk 300 left adhering to the disk clamper 134, the pressing force from the protruding element 200 acts on the optical disk 300 substantially in a direction toward the center C3 of the corresponding depressed portion 122, so that the optical disk 300 is allowed to fall into the corresponding depressed portion 122 with no positional deviation from the latter. Note that where the protruding element 200 is formed so as to contact the adhering optical disk 300 over a relatively large surface area as in the described embodiment, it should be very effective to form the side surface 200 into substantially the same curved shape as the outer circumferential surface of the optical disk 300. However, in a case where the protruding element 200 is formed so as to contact the adhering optical disk 300 over a sufficiently small, flat surface area, the side surface 200 may be of a flat shape.

As stated above, the instant embodiment can effectively remove the adhering optical disk 300 from the disk clamper 134 by only providing the protruding elements 200 on the rotary table 120. Therefore, the embodiment does not require any particular complicated component dedicated to the removal of the adhering optical disk 300. Also, because the removal of the adhering optical disk 300 is performed using the conventional or existing rotating mechanism of the rotary table 120, the embodiment does not require any dedicated disk-removing mechanism. Thus, in the instant embodiment, the compulsory removal of the adhering optical disk 300 from the disk damper 134 can be effected with an extremely simple construction.

<Modification>

It should be appreciated that the present invention is not limited to the above-described embodiment and various modifications of the invention are also possible without departing from the basic principles of the invention.

Figure 11:
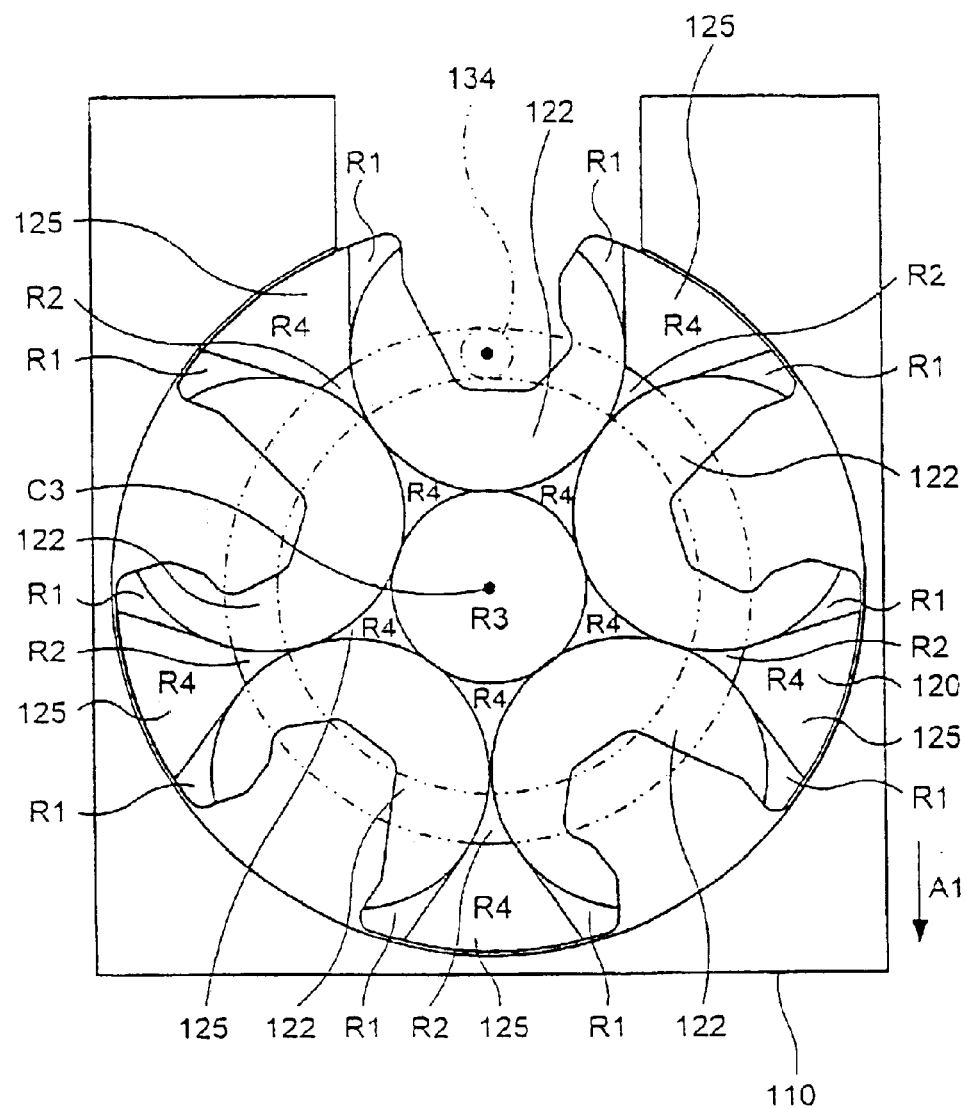
FIG. 11 is a plan view showing various upper surface areas of the rotary table in relation to provision of disk-removing protruding elements.

In the above-described embodiment, the protruding elements 200 for removing an optical disk 300 left adhering to the disk damper 134 are provided on and along the trajectory (imaginary circle line) that is defined by the respective centers C3 of the depressed portions 122 during rotation of the rotary table 120. However, the protruding elements 200 may be provided at any other suitable positions. FIG. 11 is a plan view showing various upper surface areas of the rotary table 120 in relation to the provision of the disk-removing protruding elements 200; namely, the upper surface areas of the rotary table 120 in the illustrated example can be classified into four types of areas R1 to R4 as explained below.

The first-type areas R1 are upper surface areas of the rotary table 120 that pass along the lower surface of the optical disk 300 when the tray 110 is being ejected or loaded from or into the main body 102 of the apparatus. Thus, if the protruding elements are formed on the first-type areas R1, they will hinder the ejection (or loading) of the tray 110; therefore, the protruding elements can not be formed on the first-type areas R1.

Although no fixed disk-removing protruding element 200 can be provided on the first-type areas R1 of the rotary table 120, it is possible to provide movable disk-removing elements on the first-type areas R1. For example, there may be provided a movable disk-removing protruding element in each of the first-type areas R1, which is moved to project above the lower surface of an adhering optical disk 300 when the rotary table 120 is rotated to thereby perform the necessary disk-removing function but, when the tray 110 is to be ejected (or loaded) during reproduction of an optical disk 300, is retracted below the lower surface of the optical disk 300 so as not to hinder the ejection (or loading) of the tray 110.

The second-type areas R2 are upper surface areas that pass along the lower surface of the disk damper 134 when the rotary table 120 is being rotated. Thus, if the disk-removing protruding elements 200 are provided on the second-type areas R2, they must be provided so as to be located below the lower surface 135 of the disk clamper 134 in the non-clamping position, similarly to the protruding elements 200 in the above-described embodiment.

Note that if either the disk damper 134 or each of the protruding elements 200 is chamfered appropriately, each of the protruding elements 200 may be provided so that its upper surface is located above the lower surface 135 of the disk damper 134. Specifically, because a slight play or room is left above the disk damper 134 in the non-clamping position, chamfering either the disk damper 134 or each of the protruding elements 200 allows the disk damper 134 to escape upward as any one of the protruding elements passes under the disk damper 134.

Further, the third-type area R3 is located at the center of the rotary table 120 and within an imaginary circle contacting all of the depressed portions 122. If the disk-removing protruding element is provided on this third-type area R3, it can not press an optical disk 300 adhering to the disk damper 134 and thus can not perform the function of removing the adhering optical disk 300 from the disk damper 134.

Further, the fourth-type areas R4 are other upper surface areas of the rotary table 120 than the above-mentioned first-, second- and third-type areas R1, R2 and R3. Disk-removing protruding elements 200 can be provided arbitrarily on the fourth-type areas R4, in which case the height of the disk-removing protruding elements can be chosen without regard to the position of the disk clamper's lower surface 135.

Whereas the embodiment and modifications of the present invention have been described above in relation to the case where the disk-removing protruding elements 200 are intended for optical disks 300 of a 0.12 m diameter, the present invention is not so limited. For example, movable disk-removing elements, intended for optical disks of a 0.08 m diameter, may be provided on or in the depressed portions 122 of the rotary table 122. Specifically, there may be provided such movable disk-removing elements, each of which is moved to project above the lower surface of a 0.08 m optical disk adhering to the disk damper 134 when the rotary table 120 is rotated immediately after the clamp-down operation and thereby performs the disk-removing function but, when an optical disk 300 of a 0.12 m diameter is to be loaded and reproduced, is retracted so as not to contact the recording surface of the 0.12 m optical disk 300.

Further, whereas the embodiment and modifications of the present invention have been described above in relation to the case where the rotary table 120 is rotated in one direction, immediately after the clamp-down operation, to allow any one of the disk-removing protruding elements 200 to abut against an adhering optical disk 300 just once for removal of the optical disk 300 from the disk damper 134, the present invention is not so limited. For example, an alternative arrangement may be made such that the rotary table 120 is first rotated in the counterclockwise direction A3, immediately after the clamp-down operation, until any one of the disk-removing protruding elements 200 abuts against the adhering optical disk 300 and then rotated in the other or clockwise direction A2. Because such an alternative arrangement can increase the number of times the disk-removing protruding elements 200 abuts against the adhering optical disk 300, the adhering optical disk 300 can be removed from the disk damper 134 even more effectively.

In summary, the present invention can provide an improved optical disk reproducing apparatus which can reliably bring an optical disk, left adhering to the disk clamper, back into the corresponding depressed portion of the rotary table.

What is claimed is:

1. An optical disk reproducing apparatus comprising:

a tray movable into and out of a body of said optical disk reproducing apparatus;

a rotary table rotatably mounted on said tray and having a plurality of depressed portions for holding therein a plurality of optical disks; and a disk damper that, when said rotary table is brought to a predetermined positional relationship to said tray, clamps a particular optical disk, held in one of the depressed portions, at a predetermined position above an upper surface of said rotary table for reproduction of the particular optical disk, said rotary table having a plurality of protruding elements provided in corresponding relation to the depressed portions near outer peripheral edges of corresponding ones of the depressed portions, each of the protruding elements being provided at a position where, as said rotary table is rotated upon removal of a clamping force by said disk clamper, the protruding element can press an optical disk left adhering to said disk clamper.

2. An optical disk reproducing apparatus as claimed in claim 1 wherein each of the protruding elements is provided in such a manner that an upper end of the protruding element is located below a lower surface of said disk damper when said disk damper is in a non-clamping position.

3. An optical disk reproducing apparatus as claimed in claim 1 wherein the plurality of depressed portions are provided in such a manner that respective centers thereof are located on and along a predetermined imaginary circle line defined about a rotation center of said rotary table, and the plurality of protruding elements are also located on and along the predetermined imaginary circle line.

4. An optical disk reproducing apparatus comprising:

tray means for moving into and out of a body of said optical disk reproducing apparatus;

rotary table means for being rotatably mounted on said tray means and having a plurality of depressed portions for holding therein a plurality of optical disks; and disk clamping means for, when said rotary table means is brought to a predetermined positional relationship to said tray means, clamping a particular optical disk, held in one of the depressed portions, at a predetermined position above an upper surface of said rotary table means for reproduction of the particular optical disk, said rotary table means having a plurality of protruding element means provided in corresponding relation to the depressed portions near outer peripheral edges of corresponding ones of the depressed portions, each of the protruding element means being provided at a position where, as said rotary table means is rotated upon removal of a clamping force by said disk clamping means, the protruding element means can press an optical disk left adhering to said disk clamping means.

5. A method for reproducing an optical disk in an optical disk reproducing apparatus comprising a tray movable into and out of a body of said optical disk reproducing apparatus and a rotary table rotatably mounted on said tray and having a plurality of depressed portions for holding therein a plurality of optical disks; said method comprising steps of:

clamping, when said rotary table is brought to a predetermined positional relationship to said tray, a particular optical disk held in one of the depressed portions with a disk damper at a predetermined position above an upper surface of said rotary table for reproduction of the particular optical disk, and pressing, as said rotary table is rotated upon removal of a clamping force by said disk clamper, an optical disk left adhering to said disk damper with one of a plurality of protruding elements provided on said rotary table in corresponding relation to the depressed portions near outer peripheral edges of corresponding ones of the depressed portions.

* * * * *